(12) United States Patent
Fukuda et al.

(10) Patent No.: US 11,371,214 B2
(45) Date of Patent: Jun. 28, 2022

(54) WORKING MACHINE

(71) Applicant: KUBOTA CORPORATION, Osaka (JP)

(72) Inventors: Yuji Fukuda, Osaka (JP); Ryota Hamamoto, Osaka (JP); Jun Tomita, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/076,361

(22) Filed: Oct. 21, 2020

(65) Prior Publication Data

US 2021/0123215 A1 Apr. 29, 2021

(30) Foreign Application Priority Data

Oct. 28, 2019 (JP) .............................. JP2019-195522

(51) Int. Cl.

| | |
|---|---|
| *E02F 9/22* | (2006.01) |
| *E02F 9/02* | (2006.01) |
| *F16H 61/16* | (2006.01) |
| *F16H 59/02* | (2006.01) |
| *F16H 61/4035* | (2010.01) |
| *F16H 59/00* | (2006.01) |
| *E02F 3/34* | (2006.01) |

(52) U.S. Cl.
CPC .............. *E02F 9/2253* (2013.01); *E02F 9/02* (2013.01); *F16H 59/02* (2013.01); *F16H 61/16* (2013.01); *F16H 61/4035* (2013.01); *E02F 3/3414* (2013.01); *E02F 9/2285* (2013.01); *E02F 9/2292* (2013.01); *E02F 9/2296* (2013.01); *F16H 2059/006* (2013.01)

(58) Field of Classification Search
CPC .............. F16H 2059/006; F16H 61/16; F16H 2306/24; F16H 59/02; E02F 9/2253; E02F 9/02
See application file for complete search history.

(56) References Cited

U.S. PATENT DOCUMENTS

| | | | | |
|---|---|---|---|---|
| 4,955,257 A | * | 9/1990 | Terayama | ........... F16H 61/0437 477/154 |
| 5,709,282 A | * | 1/1998 | Akira | ................... F16H 61/4069 180/307 |
| 2017/0282934 A1 | * | 10/2017 | Fukuda | ............. B60W 30/1884 |
| 2017/0297577 A1 | * | 10/2017 | Tsuji | ................... B60W 10/182 |

FOREIGN PATENT DOCUMENTS

JP         2008-082130 A    4/2008

* cited by examiner

*Primary Examiner* — Abiy Teka

(74) *Attorney, Agent, or Firm* — Greenblum & Bernstein, P.L.C.

(57) ABSTRACT

A working machine includes a machine body, a prime mover, a traveling device mounted on the machine body, a traveling motor to provide a power to the traveling device and to switch between a first speed and a second speed higher than the first speed, a traveling pump to be driven by the prime mover and to supply operation fluid to the traveling motor, and a controller device including an automatic shifter to automatically shift the traveling motor to the first speed or to the second speed, a timer to count an elapsed time from the automatically shifting, and a shift prohibitor to prohibit the automatically shifting by the automatic shifter when the elapsed time counted by the timer is less than a threshold.

13 Claims, 7 Drawing Sheets

| Prime mover rev. (rpm) | 1st dereleration judgment pressure PV1 (Mpa) (Traveling pressure) |
|---|---|
| 1000rpm | 24MPa |
| 1250rpm | 25MPa |
| 1500rpm | 26MPa |
| 1750rpm | 27MPa |
| 2000rpm | 28MPa |
| 2250rpm | 29MPa |
| 2500rpm | 30MPa |

| Prime mover rev. (rpm) | 1st returning judgment pressure QV1 (Mpa) (Traveling pressure) | U1 |
|---|---|---|
| 1000rpm | 14MPa | |
| 1250rpm | 15MPa | |
| 1500rpm | 16MPa | |
| 1750rpm | 17MPa | |
| 2000rpm | 18MPa | |
| 2250rpm | 19MPa | |
| 2500rpm | 20MPa | |

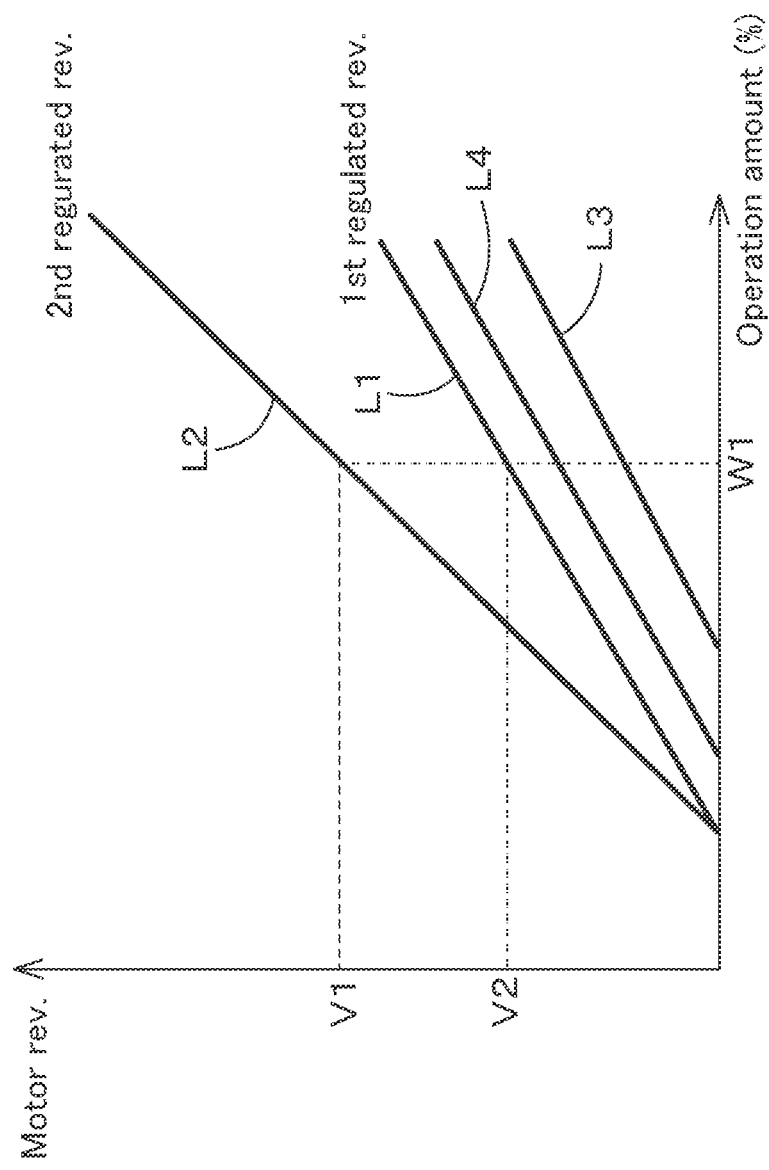

WORKING MACHINE

CROSS-REFERENCE TO RELATED APPLICATIONS

The present application claims priority under 35 U.S.C. § 119 to Japanese Patent Application No. P2019-195522, filed Oct. 28, 2019. The content of this application is incorporated herein by reference in their entirety.

BACKGROUND OF THE INVENTION

Field of the Invention

The present invention relates to a working machine.

Description of Related Art

A technique for reducing and increasing the speed of a working machine is shown in Japanese Unexamined Patent Application Publication No. 2008-82130. The working machine of Japanese Unexamined Patent Application Publication No. 2008-82130 is provided with a traveling motor capable of switching between a first speed and a second speed, which is higher than the first speed, and a traveling switch valve capable of switching the speed of the traveling motor, and wherein, when the traveling motor is at the second speed, a pressure of hydraulic fluid supplied to the traveling device is higher than a predetermined value, and the traveling motor is automatically decelerated to the first speed when a problem occurs.

SUMMARY OF THE INVENTION

A working machine includes a machine body, a prime mover, a traveling device mounted on the machine body, a traveling motor to provide a power to the traveling device and to switch between a first speed and a second speed higher than the first speed, a traveling pump to be driven by the prime mover and to supply operation fluid to the traveling motor, and a controller device including an automatic shifter to automatically shift the traveling motor to the first speed or to the second speed, a timer to count an elapsed time from the automatically shifting, and a shift prohibitor to prohibit the automatically shifting by the automatic shifter when the elapsed time counted by the timer is less than a threshold.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2A is a view showing a first deceleration judgment table T1;

FIG. 2B is a view showing a first return judgment table U1;

FIG. 3 is a view showing an example of first control information;

DESCRIPTION OF THE EMBODIMENTS

Figure 1:
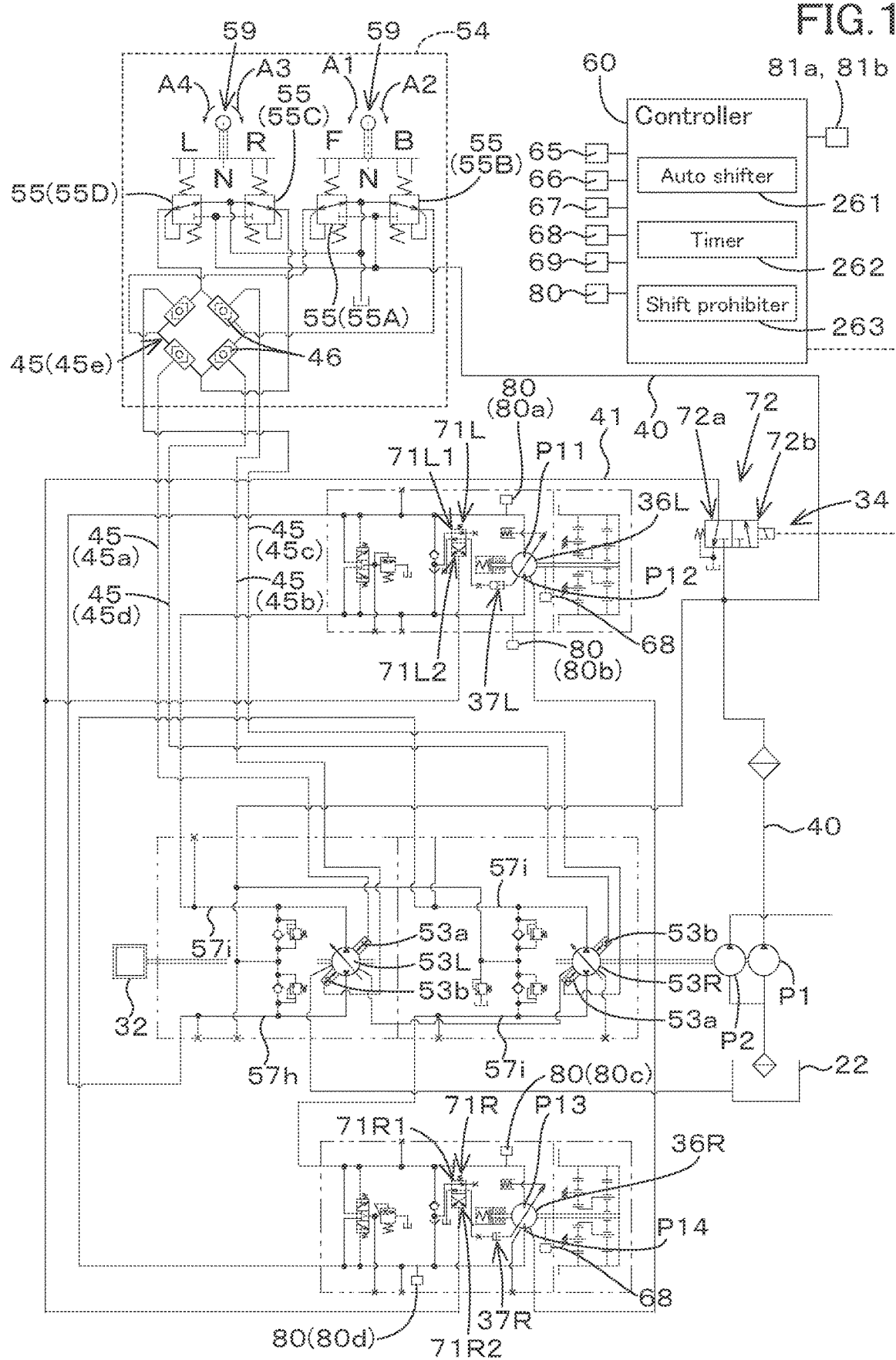
FIG. 1 is a view showing a hydraulic system (hydraulic circuit) for a working machine.

The embodiments of the present invention will now be described with reference to the accompanying drawings, wherein like reference numerals designate corresponding or identical elements throughout the various drawings. The drawings are to be viewed in an orientation in which the reference numerals are viewed correctly.

The hydraulic system for a working machine and a preferred embodiment of a working machine provided with the hydraulic system will be described below with reference to the drawings as appropriate.

Figure 6:
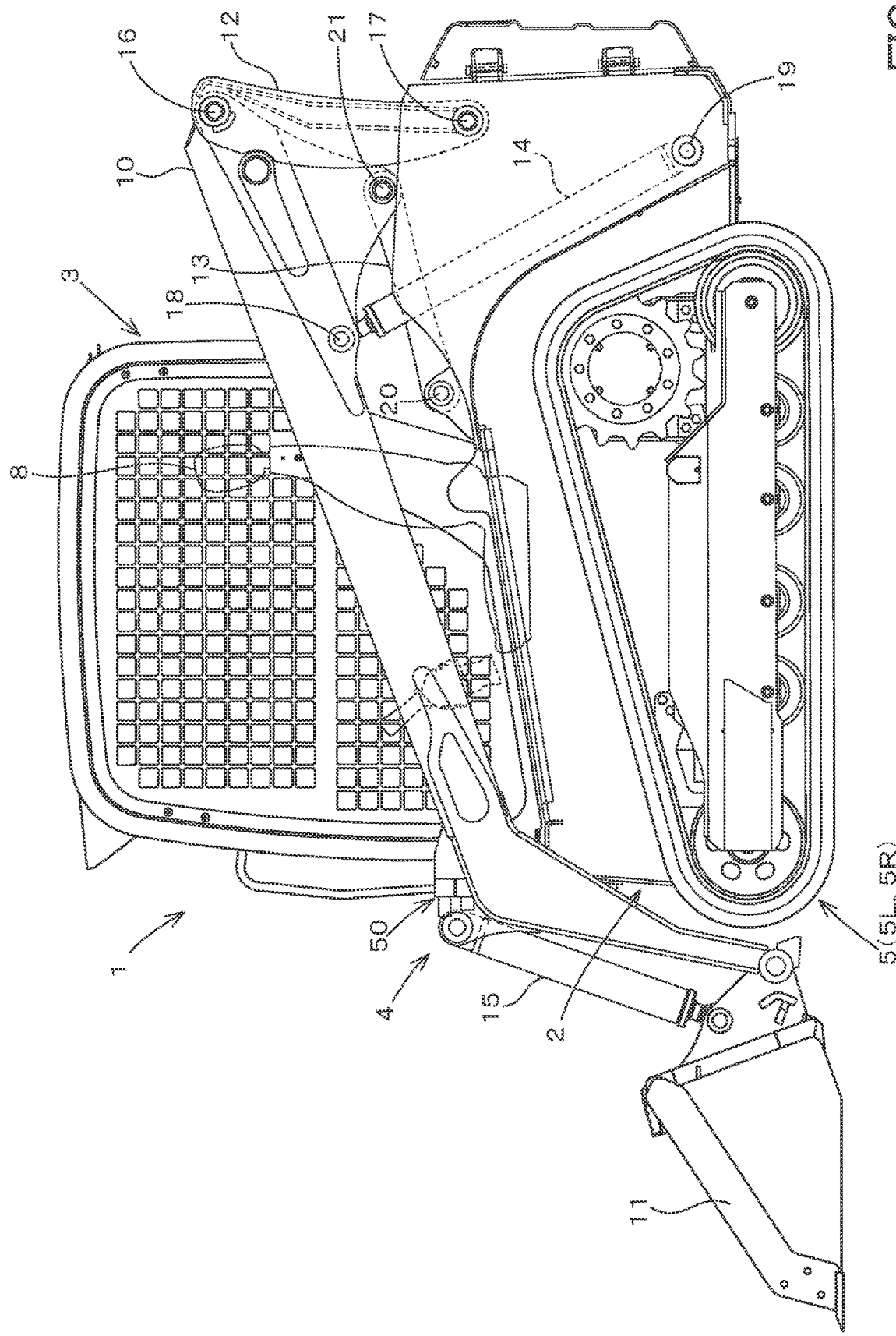
FIG. 6 is a side view of a track loader as an example of a working machine.

FIG. 6 shows a side view of a working machine in accordance with the present invention. In FIG. 6, a compact track loader is shown as an example of a working machine. However, the working machine of the present invention is not limited to a compact track loader and may be other types of loader working machine, such as a skid steer loader, for example. It may also be a working machine other than a loader working machine.

As shown in FIG. 6, the working machine 1 is provided with a machine body 2, a cabin 3, a working device 4, and a pair of traveling devices 5L and 5R.

In an embodiment of the present invention, the front side of the operator seated in the operator seat 8 of the working machine 1 (the left side of FIG. 6) is described as the front, the rear side of the operator (the right side of FIG. 6) is described as the rear, the left side of the operator (the front surface side of FIG. 6) is described as the left, and the right side of the operator (the back surface side of FIG. 6) is described as the right. The horizontal direction, which is orthogonal to the front and rear directions, is described as a machine width direction. The direction from the center of machine body 2 to the right or left is described as a machine outward direction.

In other words, the machine outward direction is the direction of the machine body width and separating away from the machine body 2. The opposite direction of the machine body is described as a machine inward direction. In other words, the machine inward direction is the direction of the machine body width, which is approaching the machine body 2.

The cabin 3 is mounted on the machine body 2. The cabin 3 is provided with an operator seat 8. The working machine 4 is mounted on the machine body 2. A pair of traveling devices 5L and 5R are provided on the outside of the machine body 2. A prime mover 32 is mounted at the rear portion inside the machine body 2.

The working machine 4 has a boom 10, a working tool 11, a lift link 12, a control link 13, a boom cylinder 14 and a bucket cylinder 15.

The booms 10 are pivotally provided on the right and left sides of the cabin 3 for vertical pivoting. The working tool 11 is, for example, a bucket, the bucket 11 being provided at the end (front end) of the boom 10 for vertical pivoting. A lift link 12 and a control link 13 support the base (rear) portion of the boom 10 so that the boom 10 can pivot up and down freely. The boom cylinder 14 raises and lowers the boom 10 by extending and shortening. The bucket cylinder 15 pivots the bucket 11 by extending and shortening.

The front portions of each boom 10 on the left and right side are connected to each other by a deformed connecting pipe. The base (rear) portion of each boom 10 is connected to each other by a circular connecting pipe.

The lift links 12, control links 13 and boom cylinders 14 are provided on the left and right sides of the machine body 2, respectively, corresponding to each boom 10 on the left and right side.

A lift link 12 is provided vertically at the rear portion of the base of each boom 10. The upper portion (one end side) of the lift link 12 is pivoted freely around a horizontal axis via a pivot shaft 16 (pivot shaft) near the rear of the base of each boom 10.

The lower portion (the other end side) of the lift link 12 is pivoted freely around the horizontal axis via the pivot shaft 17 (pivot shaft) near the rear portion of the machine body 2. The pivot shaft 17 is provided below the pivot shaft 16.

The upper portion of the boom cylinder 14 is pivotally pivoted around a horizontal axis via a pivot shaft 18 (pivot axis). The pivot shaft 18 is the base of each boom 10 and is located at the front portion of the base. The lower portion of the boom cylinder 14 is pivoted freely around the horizontal axis via a pivot shaft 19 (pivot axis). The pivot shaft 19 is located near the bottom of the rear of the machine body 2 and below the pivot shaft 18.

A control link 13 is provided in front of the lift link 12. One end of the control link 13 is rotatably pivoted around a horizontal axis via a pivot shaft 20 (pivot axis). The pivot shaft 20 is located on the machine body 2, corresponding to the front portion of the lift link 12.

The other end of the control link 13 is pivoted rotatably around a horizontal axis via a pivot shaft 21 (pivot axis). The pivot shaft 21 is a boom 10, which is provided in front of and above the pivot shaft 17.

By extending and shortening the boom cylinder 14, each boom 10 pivots up and down around the pivot shaft 16 while the base of each boom 10 is supported by the lift link 12 and the control link 13, and the tip of each boom 10 is raised and lowered.

The control link 13 pivots up and down around the pivot axis 20 with the vertical oscillation of each boom 10. The lift link 12 pivots back and forth around the pivot axis 17 with the vertical pivoting of the control link 13.

The front of the boom 10 can be fitted with another work tool in place of the bucket 11. Another work tool is, for example, a hydraulic crusher, a hydraulic breaker, an angle bloom, an earth auger, a pallet fork, a sweeper, a mower, a snow blower and other attachments (auxiliary attachments).

A connecting member 50 is provided at the front of the boom 10 on the left side. The connecting member 50 is a device that connects the hydraulic device on the auxiliary attachment to a pipe or other first pipe material on the boom 10.

In particular, a first tube material can be connected to one end of the connecting member 50, and a second tube material connected to the hydraulic device of the auxiliary attachment can be connected to the other end. As a result, the hydraulic fluid flowing through the first tube material passes through the second tube material and is supplied to the hydraulic device.

The bucket cylinders 15 are located near the front of each boom 10, respectively. By extending and shortening the bucket cylinders 15, the bucket 11 is pivoted.

Of the pair of traveling devices 5L and 5R, the traveling device 5L is provided on the left side of the machine body 2 and the traveling device 5R is provided on the right side of the machine body 2. The pair of traveling devices 5L and 5R are of the crawler type (including the semi-crawler type) in this embodiment.

A wheel-type traveling device having a front wheel and a rear wheel may be employed. Hereinafter, for convenience of explanation, the driving device 5L may be referred to as the left driving device 5L and the driving device 5R may be referred to as the right driving device 5R.

The prime mover 32 is a diesel engine, an internal combustion engine such as a gasoline engine, an electric motor, and the like. In this embodiment, the prime mover 32 is a diesel engine, but is not limited thereto.

Next, the hydraulic system for the working machine will be explained.

As shown in FIG. 1, the hydraulic system for the working machine is provided with a first hydraulic pump P1 and a second hydraulic pump P2. The first hydraulic pump P1 is a pump driven by the power of the prime mover 32 and is composed of a gear pump of a constant capacity type. The first hydraulic pump P1 is capable of outputting the hydraulic fluid stored in the tank 22. In particular, the first hydraulic pump P1 discharges hydraulic fluid that is primarily used for control.

For convenience of explanation, the tank 22 storing the hydraulic fluid is sometimes referred to as the hydraulic fluid tank. The hydraulic fluid output from hydraulic pump 1 P1 that is used for control purposes is referred to as the pilot fluid and the pilot fluid pressure is referred to as the pilot pressure.

The second hydraulic pump P2 is a pump driven by the power of the prime mover 32 and is composed of a gear pump of a constant capacity type. The second hydraulic pump P2 is capable of outputting hydraulic fluid stored in the tank 22 and supplies hydraulic fluid, for example, to the fluid line of the working system.

For example, the second hydraulic pump P2 supplies hydraulic fluid to the control valve (flow control valve) that controls the boom cylinder 14 that operates the boom 10, the bucket cylinder 15 that operates the bucket, and the auxiliary hydraulic actuator that operates the auxiliary hydraulic actuator.

The hydraulic system for the working machine is provided with a pair of traveling motors 36L, 36R and a pair of traveling pumps 53L, 53R. The pair of traveling motors 36L and 36R are motors that transmit power to a pair of traveling devices 5L and 5R.

Of the pair of traveling motors 36L and 36R, one of the traveling motors 36L transmits the power of revolutions to the traveling device (left traveling device) 5L and the other traveling motor 36R transmits the power of revolutions to the traveling device (right traveling device) 5R.

The pair of traveling pumps 53L, 53R are pumps driven by the power of the prime mover 32, for example, a swash plate type variable displacement axial pump. The pair of traveling pumps 53L, 53R supply hydraulic fluid to each of the pair of traveling motors 36L, 36R as they are driven.

Of the pair of traveling pumps 53L and 53R, one traveling pump 53L supplies hydraulic fluid to the traveling pump 53L and the other traveling pump 53R supplies hydraulic fluid to the traveling pump 53R.

For convenience of explanation, the traveling pump 53L may be referred to as the left traveling pump 53L, the traveling pump 53R may be referred to as the right traveling pump 53R, the traveling motor 36L may be referred to as the left traveling motor 36L, and the traveling motor 36R may be referred to as the right traveling motor 36R.

The left traveling pump 53L and the right traveling pump 53R have a pressure receiver portion 53a for forward travel and a pressure receiver portion 53b for backward travel, wherein the pressure of the hydraulic fluid (pilot pressure) from the first hydraulic pump P1 (pilot pressure) acts, and the angle of the swash plate is changed by the pilot pressure acting on the pressure receiving portions 53a and 53b. By changing the angle of the swash plate, the output of the left traveling pump 53L and the right traveling pump 53R (discharge amount of hydraulic fluid) and the direction of discharge of the hydraulic fluid can be changed.

The left traveling pump 53L is connected to the left traveling motor 36L by means of the connecting fluid line 57h, and the hydraulic fluid output by the left traveling pump 53L is supplied to the left traveling motor 36L. The right-hand drive pump 53R is connected to the right-hand traveling motor 36R by means of the connecting fluid line 57i, and the hydraulic fluid output by the right-hand drive pump 53R is supplied to the right-hand traveling motor 36R.

The left traveling motor 36L is capable of revolutions by the hydraulic fluid output from the left traveling pump 53L, and the revolutions speed (number of revolutions) can be changed by the flow rate of the hydraulic fluid. A swash plate switching cylinder 37L is connected to the left traveling motor 36L, and the revolutions speed (number of revolutions) of the left traveling motor 36L can also be changed by extending and shortening the swash plate switching cylinder 37L to one side or the other.

That is, when the swash plate switching cylinder 37L is shortened, the speed of the left traveling motor 36L is set to a low speed (first speed), and when the swash plate switching cylinder 37L is extended, the speed of the left traveling motor 36L is set to a high speed (second speed). In other words, the speed of the left traveling motor 36L can be changed between the first speed, which is on the lower side, and the second speed, which is on the higher side.

The right traveling motor 36R is capable of revolutions by the hydraulic fluid output from the right traveling pump 53R, and the revolutions speed (number of revolutions) can be changed by the flow rate of the hydraulic fluid. A swash plate switching cylinder 37R is connected to the right traveling motor 36R, and the revolutions speed (number of revolutions) of the right traveling motor 36R can also be changed by extending and shortening the swash plate switching cylinder 37R to one side or the other.

That is, when the swash plate switching cylinder 37R is shortened, the speed of the right traveling motor 36R is set to a low speed (first speed), and when the swash plate switching cylinder 37R is extended, the speed of the right traveling motor 36R is set to a high speed (second speed). In other words, the number of revolutions of the right traveling motor 36R can be changed between the first speed, which is on the lower side, and the second speed, which is on the higher side.

As shown in FIG. 1, the hydraulic system for the working machine is provided with a traveling switch valve 34. The travel switching valve 34 is switchable between a first state of setting the revolutions speed (speed) of the traveling motor (left traveling motor 36L, right traveling motor 36R) to a first speed and a second state of setting the speed to a second speed. The traveling switch valve 34 has a first switching valves 71L and 71R, and a second switching valve 72.

The first switching valve 71L is a two-position switching valve connected via a fluid circuit to the swash plate switching cylinder 37L of the left traveling motor 36L, which switches to the first position 71L1 and the second position 71L2. The first switching valve 71L contracts the swash plate switching cylinder 37L in the first position 71L1, and extends the swash plate switching cylinder 37L in the second position 71L2.

The first switching valve 71R is a two-position switching valve connected via a fluid circuit to the swash plate switching cylinder 37R of the right traveling motor 36R, which switches to the first position 71R1 and the second position 71R2. The first switching valve 71R contracts the swash plate switching cylinder 37R in the first position 71R1, and extends the swash plate switching cylinder 37R in the second position 71R2.

The second switching valve 72 is a solenoid valve that switches the first switching valve 71L and the first switching valve 71R, and is a two-position switching valve that can be switched between the first position 72A and the second position 72B by magnetization. The second switching valve 72, the first switching valve 71L and the first switching valve 71R are connected by a fluid line 41.

The second switching valve 72 switches the first switching valve 71L and the first switching valve 71R to the first position 71L1 and 71R1 when the first position 72a, and switches the first switching valve 71L and the first switching valve 71R to the second position 71L2 and 71R2 when the second position 72b.

In other words, when the second switching valve 72 is in the first position 72a, the first switching valve 71L is in the first position 71L1, and the first switching valve 71R is in the first position 71R1, the travel switching valve 34 is in the first state, and the revolutions speed of the traveling motor (left traveling motor 36L, right traveling motor 36R) is set to the first speed.

When the second switching valve 72 is in the second position 72b, the first switching valve 71L is in the second position 71L2, and the first switching valve 71R is in the second position 71R2, the traveling switching valve 34 is in the second state and the revolutions speed of the traveling motor (left traveling motor 36L, right traveling motor 36R) is set to the second speed.

Thus, the traveling motor (left traveling motor 36L and right traveling motor 36R) can be switched between a first speed, which is on the low speed side, and a second speed, which is on the high speed side, by the traveling switch valve 34.

The operation device 54 is a device for operating the traveling pumps (left traveling pump 53L and right traveling pump 53R) and is capable of changing the angle of the swash plate (swash plate angle) of the traveling pump. The operation device 54 includes an operation member 59 and a plurality of operation valves 55.

The operation member 59 is an operating lever supported by the control valve 55 and pivoted in the left and right (in the width direction of the machine body) or front and rear directions. That is, the operation member 59 is operable from the neutral position N to the right and to the left, and from the neutral position N to the front and rear, with reference to the neutral position N.

In other words, the operation member 59 can pivot in at least four directions with respect to the neutral position N. For convenience of explanation, the forward and rearward bi-directional direction, that is, the front and rear direction, is referred to as the first direction. The right and left bi-directional direction, that is, the left and right (width direction of the machine body) direction is sometimes referred to as the second direction.

The plurality of operation valves 55 are operated by a common, that is, one operation member 59. The plurality of operation valves 55 are actuated based on the oscillation of the operation member 59. A discharge fluid line 40 is connected to the plurality of operation valves 55, and hydraulic fluid (pilot fluid) from hydraulic pump 1 P1 can be supplied through the discharge fluid line 40. The plurality of operation valves 55 are an operation valve 55A, an operation valve 55B, an operation valve 55C and an operation valve 55D.

In the operation valve 55A, when the operation member 59 is pivoted forward (one side) in the front and rear direction (the first direction), the pressure of the hydraulic fluid output is changed according to the amount of operation (operation) of the front operation.

The operation valve 55B changes the pressure of the hydraulic fluid output according to the amount of operation (operation) of the posterior operation when the operation member 59 is pivoted backward (other) in the front and rear direction (first direction).

In the operation valve 55C, when the operation member 59 is pivoted to the right (one side) of the left or right direction (the second direction), the pressure of the hydraulic fluid output is changed according to the amount of operation (operation) of the right operation.

In the operation valve 55D, when the operation member 59 is pivoted in the left (other) direction (left operation), among the left and right directions (second direction), the output pressure of the hydraulic fluid varies according to the amount of operation (operation) of the left operation.

The plurality of operation valves 55 and the traveling pumps (left traveling pump 53L, right traveling pump 53R) are connected by a traveling fluid circuit 45. In other words, the traveling pump (left traveling pump 53L, right traveling pump 53R) is a hydraulic device that can be operated by hydraulic fluid output from the operation valve 55 (operation valve 55A, operation valve 55B, operation valve 55C, operation valve 55D).

The traveling fluid line 45 has a first traveling fluid line 45a, a second traveling fluid line 45b, a third traveling fluid line 45c, a fourth traveling fluid line 45d, and a fifth traveling fluid line 45e.

A first traveling fluid line 45a is a fluid line connected to the pressure receiver portion 53a of the traveling pump 53L for forward motion. A second travel fluid line 45b is connected to the backward pressure receiver portion 53b of the traveling pump 53L. A third traveling fluid line 45c is a fluid line connected to the forward receiver portion 53a of the traveling pump 53R.

The fourth traveling fluid line 45d is a fluid line connected to the rearward receiver portion 53b of the traveling pump 53R. The fifth traveling fluid line 45e is a fluid line connecting the operation valve 55, the first traveling fluid line 45a, the second traveling fluid line 45b, the third traveling fluid line 45c, and the fourth traveling fluid line 45d.

When the actuator member 59 is pivoted forward (in the direction of an arrowed line A1 shown in FIG. 1), the operation valve 55A is operated and pilot pressure is output from the operation valve 55A. This pilot pressure acts on the pressure-receiver portion 53a of the left traveling pump 53L via the first traveling fluid line 45a and on the pressure-receiver portion 53a of the right traveling pump 53R via the third traveling fluid line 45c.

This changes the swash plate angle of the left traveling pump 53L and the right traveling pump 53R, causing the left traveling motor 36L and the right traveling motor 36R to rotate forward (forward revolutions) and the working machine 1 to move straight ahead.

When the operation member 59 is pivoted backward (in the direction of an arrowed line A2 in FIG. 1), the operation valve 55B is operated, and pilot pressure is output from the operation valve 55B. This pilot pressure acts on the pressure-receiver portion 53b of the left traveling pump 53L via the second traveling fluid line 45B and on the pressure-receiver portion 53b of the right traveling pump 53R via the fourth traveling fluid line 45D.

This changes the swash plate angle of the left traveling pump 53L and the right traveling pump 53R, causing the left traveling motor 36L and the right traveling motor 36R to reverse (backward revolutions) and the working machine 1 to move straight backward.

When the operation member 59 is pivoted to the right (in the direction of an arrowed line A3 in FIG. 1), the operation valve 55C is operated and pilot pressure is output from the operation valve 55C. This pilot pressure acts on the pressure-receiver portion 53a of the left traveling pump 53L via the first traveling fluid line 45a and on the pressure-receiver portion 53b of the right traveling pump 53R via the fourth traveling fluid line 45d.

This changes the swash plate angle of the left traveling pump 53L and the right traveling pump 53R, causing the left traveling motor 36L to rotate forward and the right traveling motor 36R to reverse, causing the working machine 1 to turn to the right.

When the operation member 59 is pivoted to the left (in the direction of an arrowed line A4 in FIG. 1), the operation valve 55D is operated, and pilot pressure is output from the operation valve 55D. This pilot pressure acts on the pressure-receiver portion 53a of the right traveling pump 53R via the third traveling fluid line 45c and on the pressure-receiver portion 53b of the left traveling pump 53L via the second traveling fluid line 45b.

This changes the swash plate angle of the left traveling pump 53L and the right traveling pump 53R, causing the left traveling motor 36L to reverse and the right traveling motor 36R to rotate forward, causing the working machine 1 to turn to the left.

When the operation member 59 is pivoted in an oblique direction, the differential pressure of the pilot pressure acting on the pressure-receiver portion 53a and 53b determines the direction and speed of revolutions of the left traveling motor 36L and the right traveling motor 36R, causing the working machine 1 to turn right or left as it moves forward or backward.

That is, when the operation member 59 is pivoted forward at a left angle, the working machine 1 turns left while moving forward at a speed corresponding to the pivoting angle of the operation member 59, and when the operation member 59 is pivoted forward at a right angle, the working machine 1 turns right while moving forward at a speed corresponding to the pivoting angle of the operation member 59.

When the operation member 59 is pivoted backward at a left angle, the working machine 1 turns left while moving backward at a speed corresponding to the pivoting angle of the operation member 59, and when the operation member 59 is pivoted backward at a right angle, the working machine 1 turns right while moving backward at a speed corresponding to the pivoting angle of the operation member 59.

As shown in FIG. 1, the working machine 1 is provided with a controller device 60. The controller device 60 performs various controls of the working machine 1 and comprises a CPU, a semiconductor such as an MPU, and an electrical and electronic circuit. The controller device 60 is connected to the controller device 60 with an accelerator 65, a mode switch 66, a manual shifting member (speed switch) 67, and a speed detector device 68.

The accelerator 65 is a member for setting the number of revolutions of the prime mover 32 (motor speed) and is provided in the vicinity of the operator seat 8. The accelerator 65 is an accelerator lever supported pivotally, an accelerator pedal supported pivotally, an accelerator volume supported pivotally, an accelerator slider supported slidably, and the like. The accelerator 65 is not limited to the examples described above.

The mode switch 66 is a switch that enables or disables the automatic deceleration. For example, the mode switch 66 is a switch that can be switched ON/OFF, and when the mode switch 66 is ON, the automatic deceleration is switched to enable, and when the mode switch 66 is OFF, the automatic deceleration is switched to disable.

The speed switch 67 is provided near the operator seat 8 and can be operated by the driver (operator). The speed switch 67 is a switch for manually switching the traveling motors (left traveling motor 36L and right traveling motor 36R) to either a first or second speed.

For example, the speed switch 67 is a seesaw switch that switches between the first speed side and the second speed side, and can perform an increasing speed operation to switch from the first speed side to the second speed side, and a deceleration operation to switch from the second speed to the first speed.

The revolutions speed detector device 68 includes a sensor or the like that detects the number of revolutions of the prime mover, which detects the current number of revolutions of the prime mover (prime mover speed). The revolutions speed detector device 68 may be a device that detects the prime mover speed from the amount of operation of the accelerator 65.

The controller device 60 is provided with an automatic shifter 261. The automatic shifter 261 is an electrical and electronic circuit and the like provided in the controller device 60, a program stored in the controller device 60, and the like.

The automatic shifter 261 performs automatic deceleration control when automatic deceleration is enabled, and does not perform automatic deceleration control when automatic deceleration is disabled. The automatic shifter 261 performs deceleration processing to decelerate from the second speed to the first speed as automatic deceleration control, and recovery (speed increase) processing to return from the first speed to the second speed (speed increase) after deceleration processing.

In the automatic deceleration control, when a predetermined condition (automatic deceleration condition) is satisfied when the traveling motor (left traveling motor 36L, right traveling motor 36R) is at the second speed, the traveling motor (left traveling motor 36L, right traveling motor 36R) is automatically switched from the second speed to the first speed.

In the automatic deceleration control, at least in a situation where the traveling motor (left traveling motor 36L, right traveling motor 36R) is at the second speed, when the automatic deceleration condition is satisfied, the controller device 60 decelerates the traveling motor (left traveling motor 36L, right traveling motor 36R) from the second speed to the first speed by demagnetizing the solenoid of the second switching valve 72 and switching the second switching valve 72 from the second position 72b to the first position 72a.

In other words, the controller device 60 decelerates both the left traveling motor 36L and the right traveling motor 36R from a second speed to a first speed when performing automatic deceleration in the automatic deceleration control.

When the automatic shifter 261 satisfies the automatic return condition (automatic acceleration condition) after the automatic deceleration is performed, the solenoid of the second switching valve 72 is magnetized to switch the second switching valve 72 from the first position 72a to the second position 72b. This increases the speed of the traveling motor (left traveling motor 36L and right traveling motor 36R) from the first speed to the second speed, that is, the speed of the traveling motor is restored.

In other words, the controller device 60 automatically increases the speed of both the left traveling motor 36L and the right traveling motor 36R from the first speed to the second speed (automatic speed increase) when returning from the first speed to the second speed.

When automatic deceleration is disabled, the controller device 60 performs manual switching control to switch the traveling motors (left traveling motor 36L and right traveling motor 36R) to either the first or second speed in response to the operation of the speed switch 67.

In the manual switching control, when the speed switch 67 is switched to the first speed side, the solenoid of the second switching valve 72 is demagnetized. This sets the traveling motors (left traveling motor 36L and right traveling motor 36R) to the first speed.

In the manual switching control, when the speed switch 67 is switched to the second speed side, the solenoid of the second switching valve 72 is deactivated. This sets the traveling motors (left traveling motor 36L and right traveling motor 36R) to the second speed.

Next, the automatic deceleration condition, which is the condition under which automatic deceleration control is executed, will be explained below.

The controller device 60 (automatic shifter 261) uses the pressure in the connecting fluid lines 57h and 57i as one of the automatic deceleration conditions.

The controller device 60 is connected to the controller device 60 with a traveling pump pressure detector device 80 that detects the pressure of the connecting fluid lines 57h and 57i as the traveling pump pressure V. That is, the traveling pump pressure detector device 80 detects the pressure of the hydraulic fluid output by the left traveling pump 53L and the right traveling pump 53R into the connecting fluid lines 57h and 57i (the pressure of the connecting fluid lines 57h and 57i) as the traveling pump pressure V.

The traveling pump pressure detector device 80 is capable of detecting a plurality of traveling pump pressures of the traveling motor. In particular, the left traveling motor 36L has a first port P11 and a second port P12. The right traveling motor 36R has a third port P13 and a fourth port P14. The traveling pump pressure detector device 80 detects the traveling pump pressure in the connecting fluid lines 57h and 57i at the first port P11 side, the second port P12 side, the third port P13 side, and the fourth port P14 side, respectively.

The first port P11 is a port on the discharge side when the left traveling motor 36L rotates forward. The second port P12 is the port on the suction side when the left traveling motor 36L rotates forward. The third port P13 is a port on the discharge side when the right traveling motor 36R rotates forward. The fourth port P14 is a port on the suction side when the right traveling motor 36R rotates forward.

As shown in FIG. 1, the traveling pump pressure detector device 80 includes a first pressure detector device 80a, a second pressure detector device 80b, a third pressure detector device 80c, and a fourth pressure detector device 80d.

The first pressure detector device 80*a* is provided on the first port P11 side of the left traveling motor 36L in the connecting fluid line 57*h*, and detects the traveling pump pressure V on the first port P11 side as the first traveling pump pressure V1.

The second pressure detector device 80*b* is provided on the second port P12 side of the left traveling motor 36L in the connecting fluid line 57*h*, and detects the traveling pump pressure V on the second port P12 side as the second traveling pump pressure V2.

A third pressure detector device 80*c* is provided on the third port P13 side of the right traveling motor 36R in the connecting fluid line 57*i*, and detects the traveling pump pressure V on the third port P13 side as the third traveling pump pressure V3.

A fourth pressure detector device 80*d* is provided on the fourth port P14 side of the right traveling motor 36R in the connecting fluid line 57*i*, and detects the traveling pump pressure V on the fourth port P14 side as the fourth traveling pump pressure V4.

The controller device 60 performs automatic deceleration when the traveling pump pressure V (V1 to V4) detected by the traveling pump pressure detector device 80 is higher than or equal to the first deceleration pressure PV1 when either of the pair of traveling motors is at the second speed.

The following is a detailed explanation of how to determine the automatic deceleration using the traveling pump pressure V (V1 to V4) and the first deceleration pressure PV1.

The controller device 60 is connected to the controller device 60 with a first storage device 81*a* including a non-volatile memory or the like. The first storage device 81*a* may be incorporated in the controller device 60.

As shown in FIG. 2A, the first storage device 81*a* stores the first deceleration judgment pressure PV1 in correspondence with the revolutions speed of the prime mover. That is, the first storage device 81*a* stores the first deceleration judgment table T1, which shows the relation between the prime mover speed and the first deceleration judgment pressure PV1.

In the first deceleration judgment table T1, the first deceleration pressure PV1 increases as the engine speed increases, and when the engine speed is high, the first deceleration pressure PV1 is also high, and when the engine speed is low, the first deceleration pressure PV1 is also low.

In the first deceleration judgment table T1, for example, if the motor speed is 1000 rpm or more but less than 1250 rpm, the first deceleration judgment pressure PV1 is 24 MPa. If the engine speed is 1250 rpm or more but less than 1500 rpm, the first deceleration pressure PV1 is 25 MPa. If the engine speed is 1500 rpm or more but less than 1750 rpm, the first deceleration pressure PV1 is 26 MPa. If the engine speed is 1750 rpm or more but less than 2000 rpm, the first deceleration pressure PV1 is 27 MPa. If the engine speed is 2000 rpm or more but less than 2250 rpm, the first deceleration pressure PV1 is 28 MPa. If the engine speed is 2250 rpm or more but less than 2500 rpm, the first deceleration pressure PV1 is 29 MPa. If the engine speed is 2500 rpm or more, the first deceleration judgment pressure PV1 is 30 MPa. In other words, in the first deceleration judgment table T1, the value of the prime mover speed indicates a boundary value for setting the first deceleration pressure PV1.

The automatic shifter 261 extracts the first deceleration judgment pressure PV1 from the prime mover speed detected by the speed detector device 68 and the first deceleration judgment table T1 when the traveling motors (left traveling motor 36L and right traveling motor 36R) are at the second speed.

The automatic shifter 261, for example, extracts the first deceleration judgment pressure PV1, which is 25 MPa, from the first deceleration judgment table T1 when the prime mover speed is 1300 rpm, and extracts the first deceleration judgment pressure PV1, which is 28 MPa, from the first deceleration judgment table T1 when the prime mover speed is 2100 rpm.

The automatic shifter 261 performs automatic deceleration when the traveling pump pressures V1 to V4 detected by the traveling pump pressure detector device 80 are higher than or equal to the first deceleration judgment pressure PV1 extracted from the first deceleration judgment table T1.

In detail, the automatic shifter 261 performs automatic deceleration of the traveling motor (left traveling motor 36L, right traveling motor 36R) from the second speed to the first speed when any of the first traveling pump pressure V1, the second traveling pump pressure V2, the third traveling pump pressure V3, and the fourth traveling pump pressure V4 is higher than or equal to the first deceleration judgment pressure PV1.

Now, after automatic deceleration is performed, the automatic shifter 261 performs a return process (return control) to return the traveling motors (left traveling motor 36L and right traveling motor 36R) from the first speed to the second speed when automatic deceleration is effective.

A second storage device 81*b* including a non-volatile memory or the like is connected to the controller device 60. The second storage device 81*b* may be incorporated in the controller device 60.

As shown in FIG. 2B, the second storage device 81*b* stores the first return judgment pressure QV1 in correspondence with the revolutions speed of the prime mover. That is, the second storage device 81*b* stores the first return judgment table U1 indicating the relation between the prime mover speed and the first return judgment pressure QV1.

In the first return judgment table U1, the first return judgment pressure QV1 increases as the engine speed increases, and when the engine speed is high, the first return judgment pressure QV1 is also a high value, and when the engine speed is low, the first return judgment pressure QV1 is also a low value.

In the first return judgment table U1, as in the first deceleration judgment table T1 described above, the value of the prime mover speed indicates a boundary value for setting the first return judgment pressure QV1. For example, when the prime mover speed is 1600 rpm, the first return judgment pressure QV1 is 16 MPa.

The automatic shifter 261 extracts the first return judgment pressure QV1 from the prime mover speed detected by the speed detector device 68 and the first return judgment table U1 after automatic deceleration. When the traveling pump pressures V1 to V4 detected by the traveling pump pressure detector device 80 are less than or equal to the first return judgment pressure QV1 extracted from the first return judgment table U1, the automatic shifter 261 returns the traveling motor (the left traveling motor 36L and the right traveling motor 36R) from the first speed to the second speed.

In detail, the automatic shifter 261 automatically increases the traveling motor (left traveling motor 36L and right traveling motor 36R) from the first speed to the second speed when the first traveling pump pressure V1, the second traveling pump pressure V2, the third traveling pump pressure V3, and the fourth traveling pump pressure V4 fall below the first return pressure QV1.

In the above-described embodiment, automatic deceleration and automatic speed increase are performed based on the traveling pump pressure V (traveling pump pressures V1 to V4), but either automatic deceleration or automatic speed increase may be performed based on the motor speed of the traveling motor (left traveling motor 36L, right traveling motor 36R).

Next, automatic deceleration and speed increase based on the motor speed will be explained below.

The working machine 1 has an operation detector device 64 and a memory device 69. The operation detector device 64 is a device for detecting the amount of operation of the traveling operation member 59, and includes a potentiometer, for example.

As shown in FIG. 2, the operation detector device 64 detects an amount of operation according to the magnitude of the tilting when the traveling operation member 59 is gradually tilted from a neutral state. The operation detector device 64 can detect the amount of operation in each case of tilting the traveling operation member 59 forward or backward, tilting left or right, and tilting diagonally.

The storage device 69 includes a non-volatile memory or the like and stores control information (first control information).

As shown in FIG. 3, the control information (first control information) is information indicating the relation between the amount of operation of the traveling operation member 59 and the motor speed of the driving motors (left driving motor 36L and right driving motor 36R). The first control information is information indicated by numbers, functions, control lines, tables, and the like.

In particular, the first control information includes the first regulated speed corresponding to the amount of operation of the travel operation member 59 when the speed of the working machine 1 is the first speed, and the first regulated speed is set, for example, by the first speed line L1.

The first control information includes the second regulated speed corresponding to the amount of operation of the travel operation member 59 when the speed of the working machine 1 is the second speed, and the second regulated speed is set, for example, by the second speed line L2.

In the first speed line L1, the increase in the first regulated speed per a given amount of operation is less than the increase in the second regulated speed per a given amount of operation in the second speed line L2. That is, the slope of the second speed line L2 is steeper than that of the first speed line L1.

The automatic shifter 261 obtains the first speed regulated speed set by the first speed line L1 based on the amount of operation detected by the operation detector device 64 and the first control information when the traveling motors (left traveling motor 36L and right traveling motor 36R) are at the second speed. The automatic shifter 261 automatically decelerates (decelerates from the second speed to the first speed) when the motor speed (the actual motor speed) detected by the speed detector device 68 is less than or equal to the first regulated speed.

For example, as shown in FIG. 3, when the second speed is at the second speed and the amount of operation of the travel operation member 59 is an amount W1, the second speed regulated speed (maximum speed) of the traveling motor is a speed V1, which is indicated by the second speed line L2.

Here, when the actual motor speed of the traveling motor decreases and falls below V2 indicated by the first speed line L1 while the operation amount of the traveling operation member 59 is maintained at W1, the automatic shifter 261 decelerates automatically. On the other hand, the automatic shifter 261 returns from the first speed to the second speed when the actual motor speed is higher than or equal to the return threshold after the automatic deceleration.

As shown in FIG. 3, the first control information includes a third speed line L3 and a fourth speed line L4 in addition to the first speed line L1 and the second speed line L2. The third speed line L3 is a line for setting a deceleration threshold which is less than or equal to the first regulated speed set in the first speed line L1. The fourth speed line L4 is a line for setting a return threshold that is less than or equal to the first regulated speed defined by the first speed line L1 and higher than or equal to the deceleration threshold defined by the third speed line L3.

In other words, the storage device 69 stores a predetermined deceleration threshold below the first regulated speed and a return threshold that is below and above the first regulated speed and above the deceleration threshold.

The automatic shifter 261 performs automatic deceleration when the actual motor speed is at the second speed and the actual motor speed is less than or equal to the deceleration threshold determined by the third speed line L3. The automatic shifter 261 automatically resumes from the first speed to the second speed after the automatic deceleration when the actual motor speed is at or above the return threshold determined by the fourth speed line L4.

Now, the controller device 60 has a timer 262 and a shifting prohibitor portion 263. The timer 262 and the shifting prohibitor portion 263 are electrical and electronic circuits and the like provided in the controller device 60 and programs stored in the controller device 60. The timer 262 counts the elapsed time since the automatic gear shift.

Figure 4:
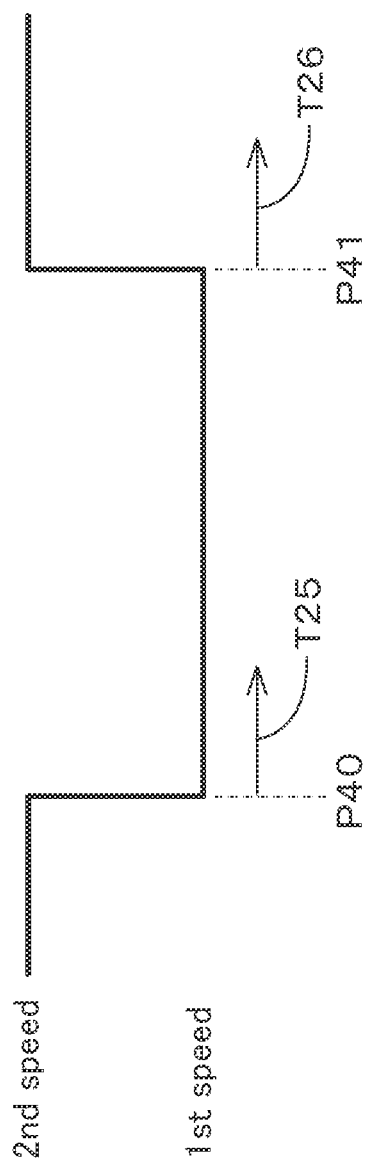
FIG. 4 is an explanation view explaining a deceleration elapsed time T25 and an acceleration elapsed time T26.

As shown in FIG. 4, the timer 262 counts the elapsed time (deceleration elapsed time) T25 from time P40 when the automatic shifter 261 performs automatic deceleration at time P40. Alternatively, the timer 262 timestamps the elapsed time (elapsed time of acceleration) T26 from the time P41, when the automatic shifter 261 performs automatic deceleration at time P41.

The shifting prohibitor portion 263 prohibits the gearshift by the automatic shifter 261 when the deceleration elapsed time T25 timed by the timer 262 is less than the threshold (deceleration prohibition time T31, acceleration prohibition time T32). The shifting prohibitor portion 263 prohibits the gearshift by the automatic shifter 261 when the acceleration elapsed time T26 timed by the timer 262 is less than the threshold (deceleration prohibition time T31, acceleration prohibition time T32).

For example, the controller device 60 stores a deceleration prohibition time T31 and an acceleration prohibition time T32. In this embodiment, the length of the deceleration prohibition time T31 and the length of the acceleration prohibition time T32 are different from the length of the deceleration prohibition time T31. The length of the acceleration prohibition time T32 is set longer than the length of the deceleration prohibition time T31.

The deceleration prohibition time T31 and the acceleration prohibition time T32 are times set to suppress chattering, and the like, for example, the deceleration prohibition time T31 is 0.1 to 0.5 seconds and the acceleration prohibition time T32 is 0.2 to 1 second. The values of the deceleration prohibition time T31 and the acceleration prohibition time T32 are not limited.

The shifting prohibitor portion 263 does not perform automatic deceleration when the deceleration elapsed time T25 is less than the acceleration prohibition time T32. The shifting prohibitor portion 263 does not perform automatic deceleration when the acceleration elapsed time T26 is less than the deceleration prohibition time T31.

Figure 5:
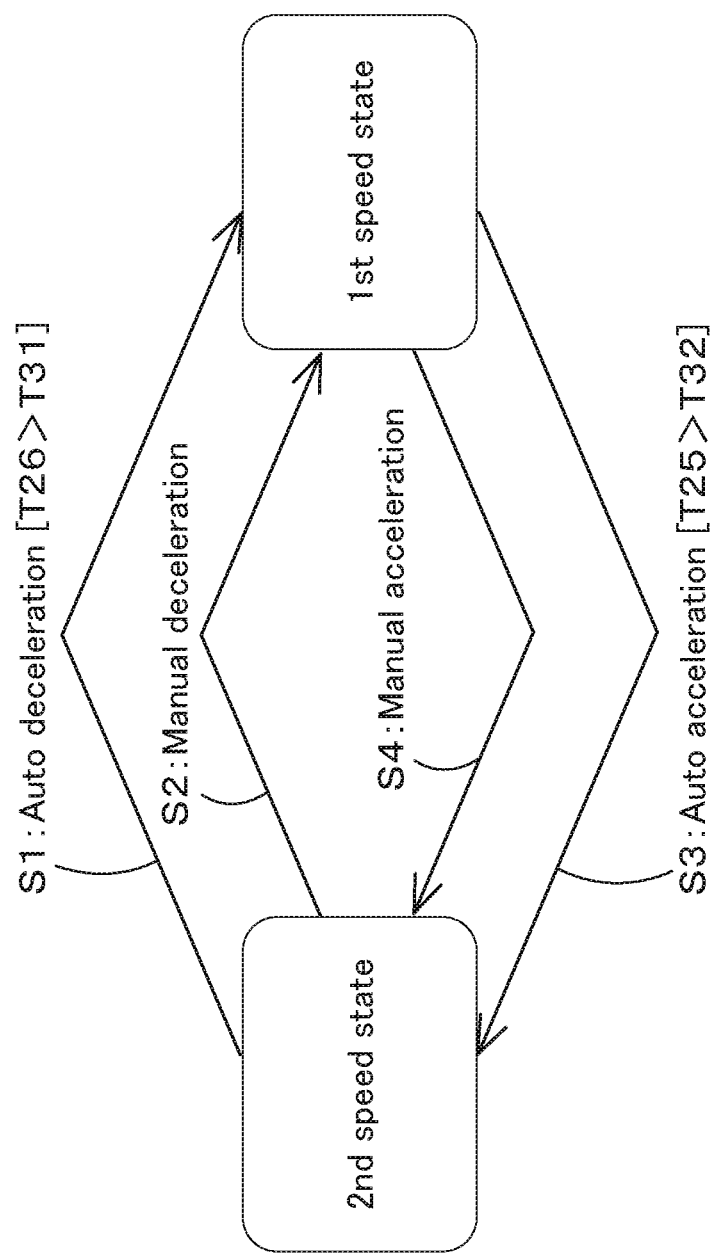
FIG. 5 is a view showing state transition of control by a controller device (an automatic shifter, a shifting prohibitor)

FIG. 5 shows a state transition diagram under the control of the control of the controller device 60 (automatic shifter 261 and shifting prohibitor portion 263).

As shown in step S1 of FIG. 5, at the second speed (second speed state), when the acceleration elapsed time T26 is higher than or equal to the deceleration prohibition time T31, and the automatic deceleration condition is satisfied, the motor automatically decelerates from the second speed to the first speed.

When the acceleration elapsed time T26 is less than the deceleration prohibition time T31, automatic deceleration is prohibited by the shifting prohibitor portion 263 even when the conditions for automatic deceleration are satisfied, and thus automatic deceleration is not performed.

On the other hand, as shown in step S2 of FIG. 5, at the second speed, when the switch is switched from the second speed side to the first speed side by the speed switch 67, the speed decelerates manually regardless of the elapsed time T26 for the increase in speed.

As shown in step S3 of FIG. 5, at the first speed (first speed state), when the deceleration elapsed time T25 is higher than or equal to the acceleration prohibition time T32 and the automatic recovery condition (automatic acceleration condition) is satisfied, the speed is automatically increased from the first speed to the second speed.

When the deceleration elapsed time T25 is less than the acceleration prohibition time T32, automatic speed increase is prohibited by the shifting prohibitor portion 263 even when the conditions for automatic speed increase are satisfied, and thus automatic speed increase is not performed.

On the other hand, as shown in step S4 of FIG. 5, when the speed is switched from the first speed side to the second speed side by the speed switch 67 at the first speed, the speed is increased manually regardless of the deceleration elapsed time T25.

The working machine 1 includes the machine body 2, the prime mover 32, the traveling devices 5L and 5R mounted on the machine body 2, the traveling motors 36L and 36R to provide a power to the traveling devices 5L and 5R and to switch between the first speed and the second speed higher than the first speed, the traveling pumps 53L and 53R to be driven by the prime mover 2 and to supply operation fluid to the traveling motors 36L and 36R, and the controller device 60 including the automatic shifter 261 to automatically shift the traveling motors 36L and 36R to the first speed or to the second speed, the timer 262 to count an elapsed time from the automatically shifting, and the shift prohibitor 263 to prohibit the automatically shifting by the automatic shifter 261 when the elapsed time counted by the timer 262 is less than a threshold.

According to this configuration, when the elapsed time after automatic shifting by the automatic shifter portion 261 is less than a threshold time, the shifting by the automatic shifter portion 261 can be prohibited, that is, the automatic shifting is not performed, so that the automatic shifting can be prevented from being performed within a short period of time after automatic shifting, and the automatic shifting can be performed smoothly. In other words, chattering that results in automatic shifting within a short period of time can be prevented.

The automatic shifter 261 performs automatic deceleration from the second speed to the first speed as an automatic shifting, the timer 262 counts the time since the automatic deceleration was performed as an elapsed time, and the shifting prohibitor portion 263 prohibits the gearshift after the automatic deceleration when the elapsed time is less than a threshold.

This prevents automatic shifting within a short time after automatic deceleration.

The automatic shifter 261 performs automatic speed increase from the first speed to the second speed as an automatic shifting, the timer 262 counts the time since the automatic speed increase was performed as an elapsed time, and the shifting prohibitor portion 263 prohibits the gearshift after the automatic speed increase when the elapsed time is less than a threshold.

This prevents automatic shifting within a short period of time after an automatic increase in speed.

The automatic shifter 261 performs automatic deceleration from the second speed to the first speed and automatic speed increase from the first speed to the second speed as an automatic shifting, the timer 262 counts the elapsed time as the elapsed time, which is the elapsed time of deceleration from the automatic deceleration and the elapsed time of speed increase from the automatic speed increase, and the shifting prohibitor portion 263 prohibits the automatic gearshift when either the elapsed time of deceleration or the elapsed time of speed increase is less than a threshold value.

According to this configuration, it is possible to prevent automatic shifting within a short period of time after automatic deceleration or automatic speed increase.

The controller device 60 stores as a threshold value a deceleration prohibition time, which is a time to prohibit automatic deceleration, and an acceleration prohibition time, which is a time that differs in length of time from the deceleration prohibition time and prohibits automatic acceleration.

According to this configuration, since the time until deceleration is performed and the time until speed increase is performed after automatic shifting is different, the timing of executing automatic deceleration and speed increase can be changed according to work.

When the elapsed time is less than the threshold, the shifting prohibitor portion 263 prohibits automatic gearshift even when the conditions for automatic gearshift are satisfied.

This ensures that repeated automatic shifting of gears in a short period of time can be prevented.

The working machine 1 is provided with a manual shifting member 67 for manual shifting operations, and the shifting prohibitor portion 263 does not prohibit shifting by the manual shifting member 67 after automatic shifting.

This allows the operator to shift gears manually at will, making it more workable.

As mentioned above, the second speed is only required to be faster than the first speed, so the working machine 1 is not limited to two speeds and can be applied to multiple stages (multiple speeds).

In the above-described embodiment, the left traveling motor 36L and the right traveling motor 36R are simultaneously switched to the first and second speeds and have a configuration in which automatic deceleration is also performed simultaneously for the left traveling motor 36L and the right traveling motor 36R. However, automatic deceleration may be performed with at least one of the left traveling motor 36L and the right traveling motor 36R switching to the first and second speeds, and at least one of the left traveling motor 36L and the right traveling motor 36R being at the second speed.

The traveling motor (left traveling motor 36L and right traveling motor 36R) may be an axial piston motor or a radial piston motor. Regardless of whether the traveling motor is a radial piston motor or a radial piston motor, the traveling motor can be switched to the first speed by increasing the motor capacity and to the second speed by decreasing the motor capacity.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A working machine comprising:
   a machine body;
   a prime mover;
   a traveling device mounted on the machine body;
   a traveling motor to provide a power to the traveling device and to switch between a first speed and a second speed higher than the first speed;
   a traveling pump to be driven by the prime mover and to supply operation fluid to the traveling motor; and
   a controller device including:
      an automatic shifter to automatically shift the traveling motor to the first speed or to the second speed;
      a timer to count an elapsed time from the automatically shifting; and
      a shift prohibitor to prohibit the automatically shifting by the automatic shifter when the elapsed time counted by the timer is less than a threshold, wherein
   the automatic shifter performs automatic deceleration to automatically shift the traveling motor from the second speed to the first speed and performs automatic acceleration to automatically shift the traveling motor from the first speed to the second speed,
   the timer counts deceleration elapsed time from the automatic deceleration and counts acceleration elapsed time from the automatic acceleration,
   the shift prohibitor prohibits the automatically shifting when the deceleration elapsed time or the acceleration elapsed time is less than a threshold, and
   the controller device stores, as the threshold, a deceleration prohibition time for which the automatic deceleration is prohibited and an acceleration prohibition time for which the automatic acceleration is prohibited, the acceleration prohibition time having a different length from the deceleration prohibition time.

2. The working machine according to claim 1, wherein
   the automatic shifter performs automatic deceleration to automatically shift the traveling motor from the second speed to the first speed,
   the timer counts time from the automatic deceleration, and
   the shift prohibitor prohibits the automatically shifting after the automatic deceleration when the elapsed time counted by the timer is less than a threshold.

3. The working machine according to claim 2, wherein when the elapsed time is less than the threshold, the shift prohibitor prohibits the automatically shifting even when a condition for the automatically shifting is satisfied.

4. The working machine according to claim 1, wherein
   the automatic shifter performs automatic acceleration to automatically shift the traveling motor from the first speed to the second speed,
   the timer counts time from the automatic acceleration, and
   the shift prohibitor prohibits the automatically shifting after the automatic acceleration when the elapsed time counted by the timer is less than a threshold.

5. The working machine according to claim 4, wherein when the elapsed time is less than the threshold, the shift prohibitor prohibits the automatically shifting even when a condition for the automatically shifting is satisfied.

6. The working machine according to claim 1, wherein when the elapsed time is less than the threshold, the shift prohibitor prohibits the automatically shifting even when a condition for the automatically shifting is satisfied.

7. The working machine according to claim 1, wherein when the elapsed time is less than the threshold, the shift prohibitor prohibits the automatically shifting even when a condition for the automatically shifting is satisfied.

8. The working machine according to claim 1, wherein when the elapsed time is less than the threshold, the shift prohibitor prohibits the automatically shifting even when a condition for the automatically shifting is satisfied.

9. A working machine comprising
   a machine body;
   a prime mover;
   a traveling device mounted on the machine body;
   a traveling motor to provide a power to the traveling device and to switch between a first speed and a second speed higher than the first speed;
   a traveling pump to be driven by the prime mover and to supply operation fluid to the traveling motor;
   a controller device including:
      an automatic shifter to automatically shift the traveling motor to the first speed or to the second speed;
      a timer to count an elapsed time from the automatically shifting; and
      a shift prohibitor to prohibit the automatically shifting by the automatic shifter when the elapsed time counted by the timer is less than a threshold; and
   a manual shifter to allow manual shifting operation, wherein
   the shift prohibitor does not prohibit the manual shifting operation by the manual shifter after the automatically shifting.

10. A working machine comprising:
    a machine body;
    a prime mover;
    a traveling device mounted on the machine body;
    a traveling motor to provide a power to the traveling device and to switch between a first speed and a second speed higher than the first speed;
    a traveling pump to be driven by the prime mover and to supply operation fluid to the traveling motor;
    a traveling pump pressure detector provided in a connecting fluid line between the traveling motor and the traveling pump, and configured to detect traveling pump pressure of the operation fluid in the connecting fluid line;

a prime-mover speed detector to detect a prime-mover speed of the prime mover;
a first memory to store a deceleration judgment pressure of the traveling pump pressure corresponding to the prime-mover speed; and
a controller connected to the traveling pump pressure detector, the prime-mover speed detector and the first memory, wherein
the controller includes
    an automatic shifter to automatically shift the traveling motor from the second speed to the first speed, when the traveling pump pressure is greater than the deceleration judgment pressure,
    a timer to count a deceleration elapsed time after the automatic shifter automatically shift the traveling motor from the second speed to the first speed, and
    a shift prohibitor to prohibit the automatic shifter to automatically shift the traveling motor from the first speed to the second speed, while the deceleration elapsed time is less than a predetermined acceleration prohibition time.

11. The working machine according to claim 10, comprising:
a second memory to store a return judgment pressure of the traveling pump pressure corresponding to the prime-mover speed, the second memory being connected to the controller, wherein
the automatic shifter automatically shifts the traveling motor from the first speed to the second speed, after automatically shifting the traveling motor from the second speed to the first speed, when the traveling pump pressure is less than the return judgment pressure,
the timer counts an acceleration elapsed time after the automatic shifter automatically shift the traveling motor from the first speed to the second speed, and
the shift prohibitor prohibits the automatic shifter to automatically shift the traveling motor from the second speed to the first speed, while the acceleration elapsed time is less than a predetermined deceleration prohibition time.

12. A working machine comprising:
a machine body;
a prime mover;
a traveling device mounted on the machine body;
a traveling motor to provide a power to the traveling device and to switch between a first speed and a second speed higher than the first speed;
a traveling pump to be driven by the prime mover and to supply operation fluid to the traveling motor;
a motor speed detector to detect a motor speed of the traveling motor; and
a controller connected to the motor speed detector, wherein
the controller includes
    an automatic shifter to automatically shift the traveling motor from the second speed to the first speed, when the motor speed is less than a predetermined deceleration threshold,
    a timer to count a deceleration elapsed time after the automatic shifter automatically shift the traveling motor from the second speed to the first speed, and
    a shift prohibitor to prohibit the automatic shifter to automatically shift the traveling motor from the first speed to the second speed, while the deceleration elapsed time is less than a predetermined acceleration prohibition time.

13. The working machine according to claim 12, wherein
the automatic shifter automatically shifts the traveling motor from the first speed to the second speed, after automatically shifting the traveling motor from the second speed to the first speed, when the motor speed is greater than a predetermined acceleration threshold,
the timer counts a deceleration elapsed time after the automatic shifter automatically shift the traveling motor from the first speed to the second speed, and
the shift prohibitor prohibits the automatic shifter to automatically shift the traveling motor from the second speed to the first speed, while the acceleration elapsed time is less than a predetermined deceleration prohibition time.

* * * * *